No. 873,465. PATENTED DEC. 10, 1907.
C. W. SMITH.
MANURE SPREADER.
APPLICATION FILED DEC. 15, 1903. RENEWED NOV. 1, 1907.
2 SHEETS—SHEET 2.
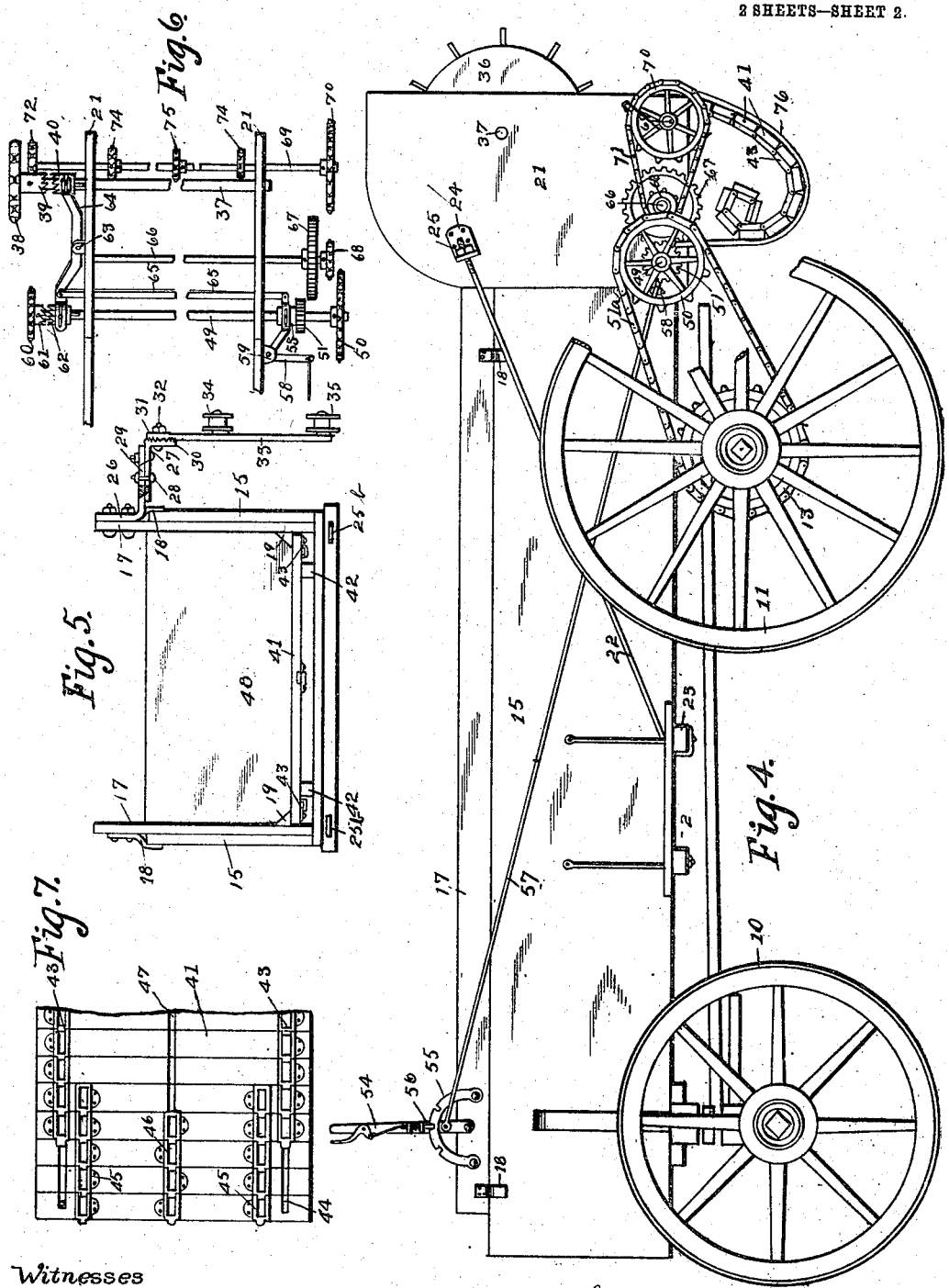
Witnesses
C. G. Hague
S. F. Christy
Inventor Charles W. Smith
By Orwig & Lane attys

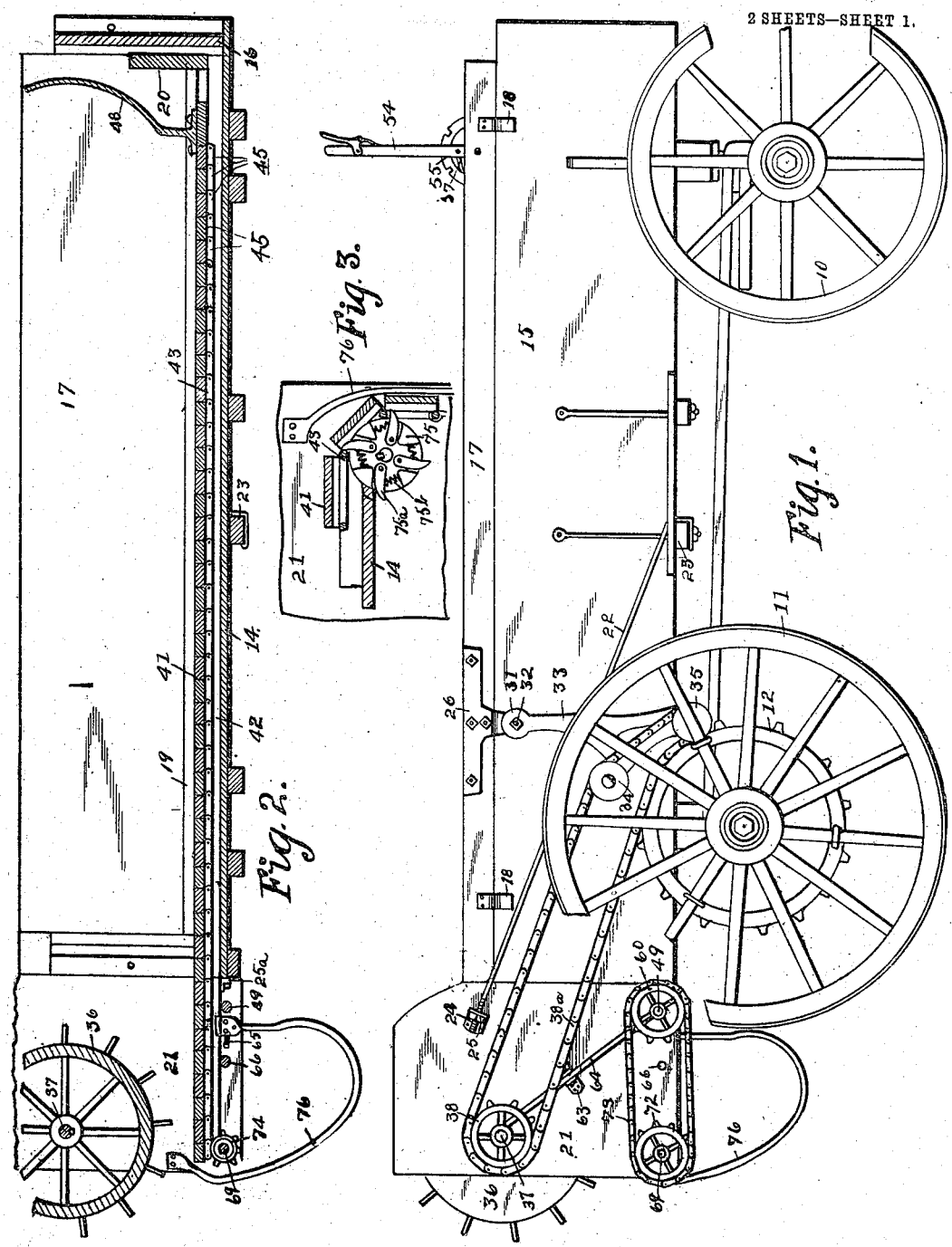

UNITED STATES PATENT OFFICE.

CHARLES W. SMITH, OF BERLIN, IOWA, ASSIGNOR TO THE WATERLOO SPREADER MANUFACTURING COMPANY, OF WATERLOO, IOWA.

MANURE-SPREADER.

No. 873,465.   Specification of Letters Patent.   Patented Dec. 10, 1907.

Application filed December 15, 1903. Serial No. 185,221. Renewed November 1, 1907. Serial No. 400,153.

To all whom it may concern:

Be it known that I, CHARLES W. SMITH, a citizen of the United States, residing at Berlin, in the county of Tama and State of Iowa, have invented certain new and useful Improvements in Manure-Spreaders, of which the following is a specification.

The objects of my invention are to provide a device of simple, durable and inexpensive construction, designed to be used in the nature of an attachment to be applied to an ordinary farm wagon, for the purpose of tearing apart and distributing a load of manure carried upon the wagon, the distributing mechanism being actuated upon the advance of the wagon.

A further object is to provide simple and inexpensive means for moving the apron rearwardly with the load to the distributer and for winding said apron in guides at the rear of the wagon, and for stopping the apron when it reaches its rearward limit of movement.

A further object is to provide simple and durable means, controlled by lever at the front of the wagon, for reversing the movement of the apron after its contents has been discharged to thereby return the apron to its position for receiving a new load.

A further object is to provide simple, durable and inexpensive means for connecting the operating mechanism of the spreader with a sprocket wheel carried by one of the wagon wheels, and also to provide means for adjusting this driving mechanism to adapt it for sprocket wheels of different sizes and for sprocket wheels located at different distances from the wagon box.

My invention consists in certain details in the construction, arrangement and combination of the various parts of the device, as hereinafter more fully set forth, pointed out in my claims and illustrated in the accompanying drawings, in which Figure 1 shows the side elevation of the complete device attached to a farm wagon. Fig. 2 shows a central longitudinal sectional view of the same. Fig. 3 shows an enlarged detail sectional view of the sprocket device for returning the apron. Fig. 4 shows a side elevation of the complete device attached to a wagon, illustrating the opposite side of the machine from that shown in Fig. 1. Fig. 5 shows a rear end elevation of the wagon box, having attached thereto the adjustable arm for holding the sprocket chain against the sprocket rim of the wagon wheel. Fig. 6 shows a top or plan view, illustrating the gearing device for driving the apron, and Fig. 7 shows an inverted plan view of the front end of the apron.

Referring to the accompanying drawings, I have used the reference numeral 10 to indicate the front wheels of the wagon; 11, the rear wheels; 12, a sprocket rim secured to one of the rear wheels of the wagon; 13, a sprocket wheel secured to the hub of the other rear wheel; 14, the bottom of the wagon box; 15, the sides of the wagon box; 16, the front end of the wagon box. The parts just described are all of the ordinary construction, and any farm wagon having said parts may be used in connection with my device.

I have provided a manure spreading attachment complete in itself, that may be readily, quickly and easily attached to a farm wagon. This attachment comprises two side boards, 17, slightly higher than the sides of an ordinary wagon and provided with lugs, 18, to overlap the outer surface of the sides 15. The bottoms of the side pieces 17 rest upon the bottom of the wagon box. Fixed to the inner faces of the sides 17, near the lower edges thereof, are the strips 19, having their top faces inclined for purposes hereinafter stated. At the front the side pieces 17 are connected by the cross piece 20.

The reference numeral 21 indicates a frame in which the operating mechanism of the device is contained, and which is supported by means of the rods 22 fixed to the cross piece 23 under the wagon box and passed through lugs, 24, on the sides of the frame 21 and provided with nuts, 25, by which the frame 21 may be firmly held to the said rods. The bottom of the frame 21 is detachably supported upon the rear of the bottom of the wagon box by means of lugs, 25$^a$, on the frame, entering slotted loops, 25$^b$, on the bottom of the wagon box.

On one of the side pieces 17 I have provided a bracket, 26, having an arm, 27, adjustably attached thereto by means of the bolts 28, in the slots 29. Formed on said arm is a notched disk, 30, and a mating notched disk, 31, is connected with the disk 30 by the bolt 32, and formed integral with the notched disk 31 is an arm 33, having mounted thereon two grooved wheels, 34 and 35. By the arrangement just described, the arm 33 may be adjusted relative to the side 17 to stand at different distances from said side, and by means of the disks 30 and 31, connected by the bolt 32, the incline of said arm may be adjusted.

Mounted in the frame 21 is a toothed manure spreading cylinder, 36, fixed to the shaft 37. This shaft is provided with a sprocket wheel, 38, rotatably mounted and provided with a ratchet faced clutch, 39. The connection between said sprocket wheel and the shaft is of the ordinary kind and may consist of a pin passed through the hub of the sprocket wheel into an annular groove on the shaft.

Mounted on the shaft 37, adjacent to the clutch member 39, is a mating clutch member, 40, slidingly and non-rotatably mounted on the shaft 37, said parts being so arranged that when the clutch members 39 and 40 are in engagement the shaft 37 will be driven by the sprocket wheel 38, and when they are separate, as shown in Fig. 6, the rotation of the sprocket wheel 38 will not drive the manure spreading roller. The said sprocket wheel, 38, is driven by a chain, 38ª, passed around the sprocket wheel 38, over the grooved roller 34 and around the grooved roller 35, the said roller 35 being designed to hold the sprocket chain firmly in engagement with the sprocket rim 12 on the wagon wheel 11, and the grooved roller 34 acts as a chain tightener.

The apron is composed of a number of transverse strips, 41, resting on top of two longitudinal strips, 42, placed on the bottom of the wagon box, extending to a point near the rear end of the frame 21 and fixed at their front ends to the cross piece 20. On the under side of the strips 41 are two chains, 43, 43, composed of links pivotally connected with each other, each link being of the same length as the width of the strip to which it is attached, thus providing a continuous apron that may be rolled up. These chains, 43, extend toward the front of the apron to a point a short distance from the front end of the apron, and beyond the ends of the chains 43 I have provided grooves, 44, in the under surfaces of the strips 41, as shown in Fig. 7. The said strips at the front of the apron that are not united by the chains 43 are connected by short chains, 45, placed out of line with the chains 43, and at the central portion of the apron and at the front end thereof, is a short sprocket chain, 46, and the under surface of the strips 41 are provided with a groove, 47, in line with this central chain 46 and extending to a point near the rear of the apron. Fixed to the forward end of the apron is an upright, curved plate, 48, extending transversely of the apron and forming an end piece. I have provided means for automatically moving this apron both rearwardly and forwardly, as follows: Mounted in the frame 21, near its lower forward corner, is a shaft, 49, having fixed to one end a sprocket wheel, 50, connected by the chain 51ª with the sprocket wheel 13, so that it is constantly driven during the advance of the wagon. Mounted on the same shaft, adjacent to the sprocket wheel 50, is a pinion, 51, slidingly and non-rotatably mounted on the shaft 49 and provided with a hub, 53. I have provided for moving the pinion 51 longitudinally on its shaft as follows: Pivoted to the front end of one of the sides 17 is a lever, 54 and fixed to the side 17, and adjacent to the lever is a segmental rack, 55; a spring-actuated pawl, 56, carried by the lever, co-acts with the said rack. Attached to the lever is a rod, 57, the rear end of which is pivoted to a bell crank lever, 58, fulcrumed to a bracket, 59 on the frame 21, said lever, 58, being connected with the hub 53 of the pinion 51 controlling its movements longitudinally on the shaft. The connection between lever 58 and hub 53 is of the ordinary kind and hence is not shown in detail. A connection of this kind is usually made by forming an annular groove in the hub and placing a collar in the groove having pins projecting outwardly therefrom through slots in the lever.

On the opposite end of the shaft 49 is a sprocket wheel, 60, loosely mounted on the shaft and provided with a clutch member, 61. On the same shaft is a mating clutch member, 62, slidingly mounted to rotate with the shaft and to co-act with the clutch member 61. The numeral 63 indicates a bracket on the side of the frame 21 pivotally supporting the lever 64. One end of the lever 64 is connected with the clutch member 40 and the other end with the clutch member 62, these connections are the same as between lever 58 and hub 53 and so arranged that when one of said clutch members is in engagement with its mating clutch the other will be out of engagement, although said lever may be set in position as indicated in Fig. 6, with both of its clutch members out of engagement with their mating clutches. I have provided for moving the lever 64, as follows: The numeral 65 indicates a link pivoted to the lever 58 and to the end of the lever 64 adjacent to the clutch 62, so that the lever 64 is controlled by the lever 54. The said lever, 54, is capable of being stopped and held by its pawl in at least three different positions. In one position the pinions 51 and 67 are together, and the clutch members 39 and 40 are together. In its second position, all of the clutches and the pinions 51 and 67 are out of engagement, as shown in Fig. 6, and in its third position only the clutch members 61 and 62 are in engagement. Mounted in the frame 21, a short distance in the rear of the shaft 49, is a shaft, 66, having fixed thereto a pinion, 67, meshed with the pinion 51, and also having a sprocket wheel, 68, fixed thereto.

Mounted in the frame 21, in the rear of the shaft 66, is another shaft, 69, having fixedly mounted on one end a sprocket wheel, 70, connected with the sprocket wheel 68 by the chain 71. On the other end of the shaft 69 is fixed a sprocket wheel, 72, connected with the sprocket wheel 60 by the chain 73. On this same shaft, 69, between the sides of the frame 21, are two fixed sprocket wheels, 74, in position to engage the sprocket chains 43 of the apron, as will hereinafter appear, and on the center of the shaft 69 is fixed a sprocket device, 75, designed to engage the short sprocket chain 46 of the apron. This sprocket device, 75, is clearly illustrated in Fig. 3 of the drawings, and is composed of a wheel having a number of pivoted sprocket teeth, 75$^a$, extending through openings in the rim of the wheel and each held at one limit of its movement by an extensile coil spring, 75$^b$. All of the sprocket wheels, 74 and 75, project far enough above the bottom 14 of the wagon to engage their respective sprocket chains. By means of the gearing devices above described, it is obvious that the shaft 69 may be made to rotate in either direction when the wagon is advanced, or it may be held inoperative.

I have provided for rolling up and carrying the apron at the rear of the frame 21, as follows: The numeral 76 indicates a number of guide rods, fixed at one end to the frame 21 directly beneath the shaft 69 and inclined downwardly and rearwardly, then downwardly and forwardly and then upwardly and attached to the under surface of the frame 21, so that when the apron moves rearwardly it will engage the rods 76 and wind up within said rods in the manner indicated in Fig. 4.

In practical use I first place the side boards 17, having connected therewith the cross piece 20 and the strips 42, inside of the wagon box. The side boards 17 are firmly held in position by the lugs 18 overlapping the sides 15 of the wagon box. Then I attach the frame 21, by placing the lugs 25$^a$ thereof in the loops 25$^b$ of the wagon box and then connecting the rods 22 with the cross piece 23 at the front and the lugs 24 at the rear. The said side boards 17 and the frame 21 contain all of the operative mechanism of the device except the chains which connect the wagon wheels with the sprocket wheels of my attachment. These chains, 38$^a$ and 51$^a$, are then placed in position and the device is ready for use.

Assuming the apron 41 to be resting flat upon the strips 42, the device is ready to receive its load. When loaded, the wagon may be driven to the place where it is desired to distribute the load; then the operator manipulates the lever 54 in such manner as to throw the pinion 51 into mesh with the pinion 67. This will throw the clutch members 61 and 62 out of engagement with each other and it will also throw the clutch members 39 and 40 and the pinions 51 and 67 into engagement with each other. By this means the shaft 69 is driven in the direction required for moving the apron rearwardly and the sprocket 60 runs loose on its shaft. This is done by the sprocket wheels 74 engaging the sprocket chains 43 of the apron and while the shaft 69 is being rotated in this direction the shaft 37, together with the spreading cylinder is also rotated in the direction required for engaging the load and throwing it upwardly and rearwardly. The parts just described are so proportioned that the apron will move rearwardly at the speed required to constantly keep a part of the load carried by the apron in position to be engaged by the spreading cylinder. As soon as the apron begins to move rearwardly, the rear end thereof will incline downwardly and will follow the rods 76 and coil up within said rods in the manner shown in Fig. 4. The receptacle for the apron formed by the rods 76 is large enough to contain all of the apron except a few cross pieces at the front end. When the front end is moved rearwardly so far that the ends of the sprocket chains 43 have passed the sprocket wheels 74, then said sprocket wheels will rotate in the grooves 44, and hence will not drive the apron any farther and of course the apron will remain stationary. The spreading cylinder will continue to rotate.

When the operator finds that the apron has stopped and that the load has been discharged, he then manipulates the lever 54 as required to reverse the position of all of the clutches, and to throw the pinion 51 out of mesh with pinion 67 and the clutch 62 into engagement with 61, whereby through sprockets 60 and 72 and chain 73 the shaft 69 is rotated in the opposite direction and when this is done, the teeth of the said sprocket wheel 75 will engage the links of the chain 46 and will move the apron forwardly until the sprocket wheels 74 are again brought into engagement with the sprocket chains 43, whereupon the apron will be automatically returned to the position required for receiving a load. During this operation the shaft 66 runs idly. The said sprocket wheel 75 is provided with spring actuated teeth, so arranged that when the sprocket wheel is in engagement with the chain 46 and moving in a direction required for forcing the apron rearwardly, then the teeth will engage the links of the sprocket chain but will not force them rearwardly; but when the said sprocket wheel 75 is rotated in the opposite direction, then its teeth will engage the links of the chain 46 and force the apron forwardly. The said chain need only be long enough to return the apron to position where the sprocket wheels 74 may engage the chains 43, after which the teeth of the sprocket wheel 75 will run in the groove 47 of the apron.

Having thus described my invention, what I claim and desire to secure by Letters Patent of the United States therefor is,

1. The combination with a wagon box, of a flexible apron slidingly supported in the wagon box and a number of rods arranged to form a receptacle at the rear of the wagon box their rear ends positioned to receive the apron and their body portions extending downwardly and then forwardly and upwardly.

2. The combination with a wagon box, of rods fixed to the rear end of the wagon box extended downwardly and then forwardly and then upwardly and a flexible apron movably supported, in one position resting upon the bottom of the wagon box and in its other position having its rear end and body portion rolled within said rods.

3. The combination with a wagon box, of a flexible apron slidingly supported in the wagon box and a number of rods arranged to form a receptacle at the rear of the wagon box their rear ends positioned to receive the apron and their body portions extending downwardly and then forwardly and upwardly and means for moving the apron rearwardly when the wagon is advanced.

4. The combination with a wagon box, of rods fixed to the rear end of the wagon box extended downwardly and then forwardly and then upwardly, a flexible apron movably supported, in one position resting upon the bottom of the wagon box and in its other position having its rear end and body portion rolled within said rods and means for moving the apron rearwardly when the wagon is advanced.

5. The combination with a wagon box, of a flexible apron slidingly supported in the wagon box, and having a rearward free end, means for moving the apron rearwardly when the wagon is advanced, other means at the rear of the wagon box for causing the free end of the apron to roll when moved rearwardly, said latter means being also adapted to hold the apron when rolled, means for moving the apron forwardly when the wagon is advanced, and means for controlling said apron-moving means.

6. The combination with a wagon box, of a flexible apron slidingly supported in the wagon box, a number of rods arranged to form a receptacle at the rear of the wagon box their ends positioned to receive the apron and their body portions extending downwardly and then forwardly and upwardly, means for moving the apron rearwardly when the wagon is advanced, means for moving the apron forwardly when the wagon is advanced and means for controlling said apron-moving means.

7. The combination with a wagon box, of rods fixed to the rear end of the wagon box extended downwardly and then forwardly and then upwardly, a flexible apron movably supported in one position resting upon the bottom of the wagon box and in its other position having its rear end and body portion rolled within said rod, means for moving the apron rearwardly when the wagon is advanced, means for moving the apron forwardly when the wagon is advanced and means for controlling said apron-moving means.

8. In a distributing wagon, the combination with the body and a reversible movable bottom, of a chain device for actuating said movable bottom, a reversible sprocket device for actuating said chain device and means whereby said chain device will automatically disengage from said sprocket device at the limit of movement of said bottom and will automatically reëngage upon the reversal of said sprocket device.

9. The combination with a wagon box, of an apron comprising cross slats, a sprocket chain on the under surface thereof extending from the rear to a point near the front, a sprocket wheel in engagement with the chain, means for rotating said sprocket wheel when the wagon is advanced, the under surface of the apron provided with a groove in front of the sprocket chain, said groove receiving the sprocket wheel when the chain has passed beyond the wheel, a second sprocket chain on the under surface of the apron at the front end of the apron and out of line with the first sprocket chain, a sprocket wheel in position to engage the second sprocket chain when the apron is moved rearwardly to position where the first sprocket chain has passed beyond its sprocket wheel, and means for rotating the second sprocket wheel in the direction required for moving the apron forwardly.

10. The combination with a wagon box, of an apron slidingly supported in the wagon box, said apron having on its under surface a sprocket chain extending from the rear of the apron to a point near the front, said apron provided with a groove at its front end portion in line with said sprocket chain, a second sprocket chain at the front end portion of the apron out of line with the first, a shaft, means for driving this shaft in opposite directions, a sprocket wheel fixed to the shaft and designed to engage the first mentioned sprocket chain and also designed to enter the groove at the front of said sprocket chain, a second sprocket wheel on the shaft having spring-actuated teeth designed to engage the second chain and to advance said chain only when the shaft is driven in the direction required for moving the apron forwardly.

11. The combination with a wagon box, of an apron slidingly supported in the wagon box, a sprocket chain on the under surface of the apron extending from the rear end of the apron to a point near the front end thereof, a sprocket chain at the front end portion of the apron out of line with the other chain, a shaft, means for rotating this shaft in opposite directions, a sprocket wheel fixed to the shaft to engage the first mentioned chain, and a sprocket wheel on the same shaft having spring-actuated teeth operating to drive the apron only when the shaft is rotated in the direction required for moving the apron forwardly.

12. The combination with a wagon box, of an apron slidingly supported in the wagon box, said apron having on its under surface a sprocket chain extending from the rear of the apron to a point near the front, said apron provided with a groove at its front end portion in line with said sprocket chain, a second sprocket chain at the front end portion of the apron out of line with the first, a shaft, means for driving this shaft in opposite directions, a sprocket wheel fixed to the shaft and designed to engage the first mentioned sprocket chain and also designed to enter the groove at the front of said sprocket chain, a second sprocket wheel on the same shaft having spring-actuated teeth designed to engage the second chain and to advance said chain only when the shaft is driven in the direction required for moving the apron forwardly, and a manually operated means for controlling the direction of rotation of said shaft.

13. The combination with a wagon box, of an apron slidingly supported upon the bottom of the wagon box, two sprocket chains on the under surface of the apron extending from the rear of the apron to a point near the front, the front of the apron provided with grooves in line with said chains, a short chain on the under surface of the front end portion of the apron out of line with the aforesaid chains, a rotatable shaft, two sprocket wheels fixed to said shaft and designed to engage the long chains of the apron, a sprocket wheel fixed to the same shaft having spring-actuated teeth and designed to engage with the short chain of the apron, a spreading roller, a sprocket wheel rotatably mounted on the roller shaft, means for rotating said sprocket wheel upon the advance of the wagon, a shaft 49, rotated upon the advance of the wagon, a rotatable sprocket wheel thereon, means for connecting this sprocket with the apron driving shaft, a pinion sliding on and rotatable with the shaft 49, a shaft 66, a pinion thereon meshed with aforesaid pinion, a sprocket wheel on the shaft 66, means for connecting it with the apron driving shaft, mechanism in one position causing the said pinions to mesh and also causing the sprocket wheel of the spreading roller to rotate the roller, said mechanism in another position freeing the roller shaft and causing the sprocket on the shaft 49 to rotate with the shaft and also holding the pinion on the shaft 49 out of mesh and in its third position freeing both the roller and the apron driving shafts.

14. In a machine of the class described, the combination of a flexible apron slidingly supported and guide rods arranged to receive one end of the apron and shaped to cause the apron to be rolled up within said rods and carried thereby.

15. The combination of a wagon, a sprocket rim secured to one of the wagon wheels, a sprocket wheel mounted upon the wagon, an arm pivotally connected to the wagon to move in a vertical plane and also adjustably connected with the wagon to move laterally, two grooved rollers carried by the arm and a sprocket chain passed around the said sprocket wheel, over one of the said grooved rollers and around the other grooved roller and designed to engage with a part of the sprocket rim.

16. The combination with a wagon, of a sprocket rim fixed to one of the wagon wheels, a bracket supported by the wagon, an arm adjustably connected with said bracket and having a notched disk thereon, a second arm having a notched disk to co-act with the first one, a bolt connecting the said disks, two grooved rollers carried by the latter arm and a sprocket chain passed around one of said rollers and over the other one.

17. The combination with a wagon box, of side boards to enter between the sides of the wagon box, means for detachably securing them to the wagon box, a chain supporting bracket secured to one of the said side boards, a sprocket rim on one of the wagon wheels and a sprocket chain held in engagement with the sprocket rim by said chain supporting bracket.

18. The combination with a wagon box, of side boards detachably supported inside of the wagon box and projecting above the sides of the wagon box, a cross piece secured to the forward ends of said detachable sides, longitudinal strips secured to the cross piece and resting on the bottom of the wagon box, a flexible apron on top of said strips and strips secured to the inner faces of the side boards to overlap the edges of the apron.

19. The combination with a wagon box, of side boards detachably supported inside of the wagon box and projecting above the sides of the wagon box, a cross piece secured to the forward ends of said detachable sides, longitudinal strips secured to the cross piece and resting on the bottom of the wagon box, a flexible apron on top of said strips, strips secured to the inner faces of the side boards to overlap the edges of the apron, a frame attached to the rear of the wagon box, means carried by said frame for moving the apron, a sprocket chain supporting arm carried by one of the detachable side boards and a lever carried by one of said side boards for controlling the operating mechanism.

CHARLES W. SMITH.

Witnesses
J. F. BUHMANN.
THEO. F. REHDY.